US012790131B2

(12) United States Patent
Wen et al.

(10) Patent No.: US 12,790,131 B2
(45) Date of Patent: Nov. 10, 2026

(54) AUTOMATIC CASE SEPARATING APPARATUS AND METHOD AND CASE SEPARATION SYSTEM

(71) Applicant: CONTEMPORARY AMPEREX TECHNOLOGY CO., LIMITED, Ningde (CN)

(72) Inventors: Zhihua Wen, Ningde (CN); Yunru Shi, Ningde (CN); Jun Hu, Ningde (CN); Yitai Guo, Ningde (CN); Zhongzheng Zhang, Ningde (CN); Cong Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 205 days.

(21) Appl. No.: 18/768,792

(22) Filed: Jul. 10, 2024

(65) Prior Publication Data

US 2024/0359925 A1 Oct. 31, 2024

Related U.S. Application Data

(63) Continuation of application No. PCT/CN2023/078452, filed on Feb. 27, 2023.

(30) Foreign Application Priority Data

Feb. 28, 2022 (CN) ......................... 202210192447.8

(51) Int. Cl.
*B65G 47/76* (2006.01)
*B65G 47/14* (2006.01)
(Continued)

(52) U.S. Cl.
CPC ......... *B65G 47/766* (2013.01); *B65G 47/256* (2013.01); *B65G 47/66* (2013.01); *B65G 47/14* (2013.01); *B65G 47/26* (2013.01)

(58) Field of Classification Search
CPC .... B65G 47/256; B65G 47/14; B65G 47/252; B65G 47/766; B65G 47/26; B65G 47/66
(Continued)

(56) References Cited

U.S. PATENT DOCUMENTS 3,869,117 A * 3/1975 Yoshimura ............. B65H 3/042 271/182
3,955,686 A * 5/1976 Kumagai ................. B65H 1/22 271/146
(Continued)

FOREIGN PATENT DOCUMENTS

CN 201208633 Y 3/2009
CN 202754434 U 2/2013
(Continued)

OTHER PUBLICATIONS

The World Intellectual Property Organization (WIPO) International Search Report and Written Opinion for PCT/CN2023/078452 May 20, 2023 11 Pages (including translation).
(Continued)

*Primary Examiner* — James R Bidwell
(74) *Attorney, Agent, or Firm* — ANOVA LAW GROUP, PLLC

(57) ABSTRACT

An automatic case separating apparatus includes a feeding mechanism configured to receive and deliver a plurality of cases after being unpacked, a delivery mechanism configured to receive and deliver the cases output by the feeding mechanism, and a combing mechanism configured to comb and separate at least two overlapping cases on the delivery mechanism, so that the cases are separated from each other. The plurality of cases maintain a first state before being unpacked. When the feeding mechanism delivers the cases to the delivery mechanism, the cases are in a second state on the delivery mechanism.

20 Claims, 8 Drawing Sheets

(51) Int. Cl.
*B65G 47/256* (2006.01)
*B65G 47/26* (2006.01)
*B65G 47/66* (2006.01)

(58) Field of Classification Search
USPC .................................................. 198/453, 635
See application file for complete search history.

(56) References Cited

U.S. PATENT DOCUMENTS

| | | | | |
|---|---|---|---|---|
| 4,042,234 | A * | 8/1977 | Tokuno | B65H 1/025 271/151 |
| 4,149,622 | A * | 4/1979 | Bradshaw | B07C 1/10 198/530 |
| 8,528,742 | B2 | 9/2013 | Wargo et al. | |
| 9,498,798 | B2 * | 11/2016 | Hellenbrand | B07C 5/00 |

FOREIGN PATENT DOCUMENTS

| | | | |
|---|---|---|---|
| CN | 202828978 | U | 3/2013 |
| CN | 204197943 | U | 3/2015 |
| CN | 105460573 | A | 4/2016 |
| CN | 106219212 | A | 12/2016 |
| CN | 208070847 | U | 11/2018 |
| CN | 208531006 | U | 2/2019 |
| CN | 109592312 | A | 4/2019 |
| CN | 112693875 | A | 4/2021 |
| CN | 212952886 | U | 4/2021 |
| CN | 214140284 | U | 9/2021 |
| CN | 215623260 | U | 1/2022 |
| DE | 19714805 | A1 | 10/1998 |
| DE | 102013112942 | A1 | 5/2015 |
| JP | S5948320 | A | 3/1984 |
| JP | H07223280 | A | 8/1995 |

OTHER PUBLICATIONS

State Intellectual Property Office of China The First Office Action for Application No. 202210423220.X Aug. 12, 2025 30 pages (including translation).

The European Patent Office (EPO) The Extended European Search Report for Application No. 23759324.9 Feb. 28, 2025 8 Pages.

* cited by examiner

AUTOMATIC CASE SEPARATING APPARATUS AND METHOD AND CASE SEPARATION SYSTEM

CROSS-REFERENCE TO RELATED APPLICATIONS

The present application is a continuation of International Application No. PCT/CN2023/078452, filed on Feb. 27, 2023, which claims priority to Chinese Patent Application No. 2022101924478 filed on Feb. 28, 2022 and entitled "AUTOMATIC CASE SEPARATING APPARATUS AND CASE SEPARATION SYSTEM", the entire contents of which are incorporated herein by reference.

TECHNICAL FIELD

The present application relates to the field of automated production technologies, and in particular to an automatic case separating apparatus and method and a case separation system.

BACKGROUND

During a separation process of packaged cases, manual or semi-automatic methods are generally used. For example, in a separation process of an aluminum case package in the battery industry, the aluminum case package is first manually removed and placed upside down on a production line; as the production line is running, workers on the production line pull out isolation paper between aluminum cases and separate partially overlapping aluminum cases, so that the aluminum cases are arranged in an orderly manner to facilitate subsequent mechanical loading.

However, the separation method mainly relies on manual operation, and therefore, it is easy to have irregular operations, causing bumps and scratches between aluminum cases, so that it is difficult to guarantee the quality of aluminum case separation. At the same time, manual operation during the separation process may not only increase labor costs, but also reduce the separation efficiency of aluminum cases.

SUMMARY

Based on this, it is necessary to provide an automatic case separating apparatus and method and a case separation system to replace manual operations, speed up the pace, and improve the separation efficiency and the separation quality.

In a first aspect, the present application provides an automatic case separating apparatus, including: a feeding mechanism for receiving and delivering a plurality of cases after removal of packages, wherein the plurality of cases maintain a first state before removal of packages; a delivery mechanism for receiving and delivering the cases output by the feeding mechanism, wherein when the feeding mechanism deliveries the cases to the delivery mechanism, the cases are in a second state on the delivery mechanism; a combing mechanism for combing and separating at least two of the overlapping cases on the delivery mechanism, so that the cases are separated from each other.

In a separation process, the above automatic case separating apparatus places the unpacked cases upside down on the feeding mechanism, uses the feeding mechanism to deliver a whole box of cases to the delivery mechanism, and ensures that the cases are delivered in a tipped posture on the delivery mechanism; then, the combing mechanism is used to separate at least two overlapping cases, so that the cases on the production line are separate individuals separated from each other. In this way, the automatic case separating apparatus of the present application can replace manual operations, so that the packaged cases are automatically and orderly separated, and paper removal operations are performed automatically and effectively, thereby speeding up the operation pace, and improving the separation efficiency and separation quality.

In some embodiments, the first state is defined as an upright state of the case; and the second state is defined as a tipped state of the case. Such design facilitates subsequent combing of the overlapping cases and ensures stable operation of case separating.

In some embodiments, an input end of the delivery mechanism is arranged adjacent to an output end of the feeding mechanism, and in a height direction H of the delivery mechanism, the input end of the delivery mechanism is lower than the output end of the feeding mechanism. In this way, when the cases are delivered from the feeding mechanism to the delivery mechanism, a forward tilting action may occur, so as to ensure that the cases are in a "tipped state" on the delivery mechanism, thereby ensuring the stable operation of the separation operation of the cases.

In some embodiments, the automatic case separating apparatus further includes a tipping structure, and the tipping structure is used for driving the cases on the feeding mechanism to tip toward the delivery mechanism. Such design ensures that the cases on the delivery mechanism are all in a tipped state, thereby ensuring continuous and stable operation of the case separation operation.

In some embodiments, the tipping structure includes a nozzle, the nozzle is located above the feeding mechanism, and a spray end of the nozzle is arranged toward the delivery mechanism. In this way, the overlapping cases are combed and separated effectively, so that the cases pass through a combing interval in an orderly manner.

In some embodiments, the combing mechanism includes a combing member located above the delivery mechanism, a combing interval is formed between the combing member and the delivery mechanism, and the combing interval is used for allowing a case in the second state to pass through.

In some embodiments, there are at least two combing members, all of the combing members are arranged at an interval in a delivery direction L of the delivery mechanism, and heights h of all the combing intervals show a decreasing trend in the delivery direction L of the delivery mechanism. In this way, the combing effect of the cases is strengthened, the combing effect of the cases is improved, and the delivery mechanism is prevented from delivering overlapping cases outwards to cause the separation operation to fail to operate normally.

In some embodiments, the combing member includes a main body part and a combing part with an elastic deformation function. The combing part is arranged on the main body part and forms the combing interval with the delivery mechanism. Such design not only ensures that one case can pass smoothly, but also ensures that the combing part is in close contact with a surface of the case, so that another case on the surface of the case can be scraped off, thereby further improving the combing effect of the combing mechanism.

In some embodiments, the automatic case separating apparatus further includes a removing mechanism, and the removing mechanism is used for removing a spacer on the delivery mechanism used for isolating two adjacent cases. In this way, when the spacer is exposed on the delivery mechanism, the removing mechanism is used to remove the spacer from the delivery mechanism to avoid the presence of the spacer from interfering with the loading of the case, so as to ensure the stable operation of the case separation; at the same time, it is also beneficial to achieve recycling of the spacer to realize resource recycling.

In some embodiments, the delivery mechanism includes a delivery frame and at least two conveying assemblies arranged at an interval on the delivery frame, a removing interval is formed between two adjacent conveying assemblies, and the removing mechanism is used for removing the spacer from the removing interval. In this way, the spacer can be removed smoothly under the action of the removing mechanism, further ensuring the stable operation of the separation operation of the cases.

In some embodiments, the automatic case separating apparatus further includes a recycling box, and the recycling box is located below the conveying assembly and is in communication with the removing interval. In this way, the spacers removed from the removing interval are collected to facilitate unified processing of the spacers.

In some embodiments, the automatic case separating apparatus further includes a protective enclosure, and the protective enclosure is arranged above the delivery mechanism and the combing mechanism to at least provide protection for the combing operation on the delivery mechanism. In this way, effective protection is provided for the operations on the delivery mechanism, and the automatic case separating apparatus is ensured to be carried out stably and orderly.

In a second aspect, the present application provides a case separation system, including: the automatic case separating apparatus as described in any one of the above; a discharging mechanism used for receiving and delivering the cases output by the delivery mechanism; and a tray supplying apparatus used for supplying an empty tray; and a material picking apparatus used for transferring the case on the discharging mechanism to the empty tray.

The above case separation system uses the above automatic case separating apparatus. In the separation process, the unpacked cases are placed upside down on the feeding mechanism, the feeding mechanism is used to deliver a whole box of cases to the delivery mechanism, and it is ensured that the cases are delivered in a tipped posture on the delivery mechanism; then, the combing mechanism is used to separate at least two overlapping cases, so that the cases on the production line are separate individuals separated from each other. When the cases are delivered to the discharging mechanism, the cases on the discharging mechanism are transferred to the empty tray in the tray supplying apparatus through the material picking apparatus to complete the automatic separation operation of the cases. In this way, the automatic case separating apparatus of the present application can replace manual work, so that the packaged cases are automatically and orderly separated, and automatic and effective paper removal operations are performed, thereby speeding up the operation pace, and improving the separation efficiency and separation quality.

In some embodiments, the tray supplying apparatus includes a rack and a first lifting mechanism, a second lifting mechanism, and a moving mechanism arranged on the rack. The first lifting mechanism is used for lifting an empty tray stack, such that the uppermost empty tray in the empty tray stack is moved to a tray supplying station, the second lifting mechanism is used for lowering a non-empty tray stack to vacate a loading station, and the moving mechanism is used for transferring the empty tray on the tray supplying station to the loading station.

In some embodiments, the moving mechanism includes a sliding rail and a suction cup. The sliding rail is arranged on the rack and extends in a direction from the tray supplying station to the loading station. The suction cup is slidably arranged on the sliding rail and used for sucking the empty tray on the tray supplying station.

In some embodiments, the tray supplying apparatus further includes a positioning module, and the positioning module is used for acquiring empty tray position information on the loading station to control the material picking apparatus to transfer the cases to the empty tray on the loading station. In this way, positioning information is provided for the material picking apparatus to ensure that the material picking apparatus accurately places the case into the empty tray, which is beneficial to improving the separation quality of the case.

In some embodiments, the tray supplying apparatus further includes a material preparation mechanism. The material preparation mechanism is used for placing an empty tray stack and delivering the empty tray stack to the first lifting mechanism to replenish the empty tray stack on the first lifting mechanism in time, thereby ensuring the continuous and stable operation of the case separation operation.

In some embodiments, the tray supplying apparatus further includes a tray output mechanism, and the tray output mechanism is used for receiving and outputting a non-empty tray stack output from the second lifting mechanism, and timely outputting the non-empty tray stack output on the second lifting mechanism, thereby ensuring the continuous and stable operation of the case separation operation.

In a third aspect, the present application provides an automatic case separating method, using any of the automatic case separating apparatuses described above. The method includes the following steps: controlling actions of a feeding mechanism to deliver a plurality of cases that are unpacked and maintain a first state before unpacking to a delivery mechanism; controlling the delivery mechanism to continue delivering the received cases, and controlling the cases on the delivery mechanism to be in a second state; and using a combing mechanism to comb at least two of the overlapping cases on the delivery mechanism so that the cases are separated from each other.

In some embodiments, the step of using a combing mechanism to comb at least two of the overlapping cases on the delivery mechanism includes: delivering, by using the delivery mechanism, the cases in the second state to the bottom of a combing member; and using a combing interval between the combing member and the delivery mechanism to allow one of the cases in the second state to pass, so that the cases are separated from each other. In this way, the cases pass through the combing interval one by one in an orderly manner, thereby achieving stable and orderly automatic case separating operations.

In some embodiments, the method further includes: removing, by using a removing mechanism, a spacer for isolating two adjacent cases on the delivery mechanism. In this way, it is prevented that the existence of the spacer interferes with the loading of the case, so as to ensure the stable operation of the case separation; and at the same time, it is also conducive to the recovery of the spacer and the recycling of resources.

In some embodiments, the step of removing, by using a removing mechanism, a spacer for isolating two adjacent cases on the delivery mechanism includes: delivering, by using the delivery mechanism, the spacer to a removing interval of the delivery mechanism; and blowing or sucking, by the removing mechanism, the spacer away from the delivery mechanism from the removing interval. In this way, the spacer can be removed smoothly under the action of the removing mechanism, further ensuring the stable operation of the separation operation of the cases.

The above illustrations are merely brief descriptions for the technical solutions of the present application. Specific implementation manners of the present application are described specifically in the following to understand the technical solutions of the present application more clearly and implement the present application according to content of the specification, and to make the above and other objectives, features and advantages of the present application more comprehensible.

DESCRIPTION OF DRAWINGS

By reading the detailed description of the implementations below, various other advantages and benefits will become apparent to those of ordinary skill in the art. The drawings are for the purpose of illustrating some implementations only and are not to be considered a limitation to the present application. Moreover, in all of the drawings, the same components are indicated by the same reference numerals. In the drawings.

Figure 1:
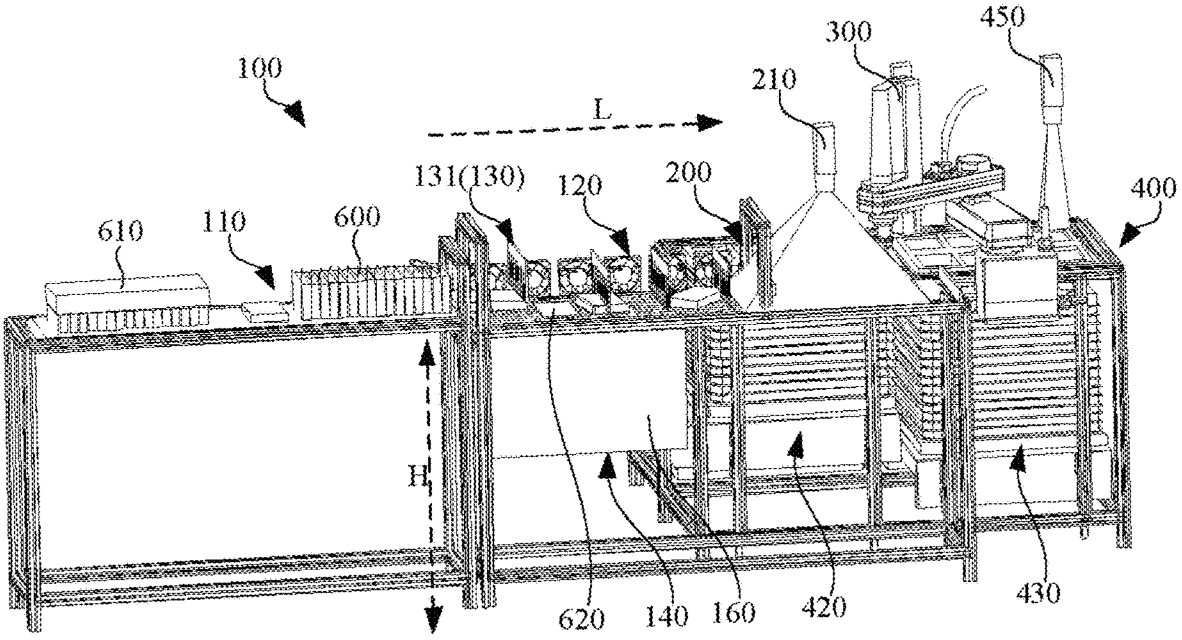
FIG. 1 is a schematic structural diagram of an automatic case separating apparatus according to some embodiments of the present application.

100. Automatic case separating apparatus; 110. Feeding mechanism; 120. Delivery mechanism; 121. Delivery frame; 122. Conveying assembly; 1221. Removing interval; 130. Combing mechanism; 131. Combing member; 1311. Main body part; 1312. Combing part; 132. Combing interval; 140. Removing mechanism; 150. Tipping structure; 151. Nozzle; 160. Recycling box; 170. Protective enclosure; 200. Discharging mechanism; 210. Detection module; 300. Material picking apparatus; 400. Tray supplying apparatus; 410. Rack; 411. Tray supplying station; 412. Loading station; 420. First lifting mechanism; 430. Second lifting mechanism; 440. Moving mechanism; 441. Sliding rail; 442. Suction cup; 450. Positioning module; 460. Material preparation mechanism; 470. Tray output mechanism; 500. Empty tray; 510. Empty tray stack; 520. Non-empty tray; 530. Non-empty tray stack; 600. Case; 610. Case package; 620. Spacer.

DETAILED DESCRIPTION

Embodiments of the technical solutions of the present application will be described in detail below with reference to the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "include/comprise" and "have" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the quantity, particular order, or primary and secondary relation of the technical features indicated. In the description of the embodiments of the present application, the meaning of "a plurality of" is two or more, unless otherwise explicitly and specifically defined.

Reference herein to an "embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "a plurality of groups" refers to two or more (including two) groups, and "a plurality of sheets" refers to two or more (including two) sheets.

In the descriptions of the embodiments of present application, orientations or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", and the like are based on orientations or positional relationships as shown in the drawings, and are only for the purpose of facilitating and simplifying the descriptions of the embodiments of the present application instead of indicating or implying that apparatuses or elements indicated must have particular orientations, and be constructed and operated in the particular orientations, so that these terms are not construed as limiting the embodiments of the present application.

In the description of the embodiments of the present application, unless otherwise expressly specified and limited, the technical terms "mount", "join", "connect", "fix", and the like should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

Embodiments of the technical solutions of the present application will be described in detail below with reference to the drawings. The following embodiments are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "include/comprise" and "have" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the quantity, particular order, or primary and secondary relation of the technical features indicated. In the description of the embodiments of the present application, the meaning of "a plurality of" is two or more, unless otherwise explicitly and specifically defined.

Reference herein to an "embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "a plurality of groups" refers to two or more (including two) groups, and "a plurality of sheets" refers to two or more (including two) sheets.

In the descriptions of the embodiments of present application, orientations or positional relationships indicated by the technical terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", and the like are based on orientations or positional relationships as shown in the drawings, and are only for the purpose of facilitating and simplifying the descriptions of the embodiments of the present application instead of indicating or implying that apparatuses or elements indicated must have particular orientations, and be constructed and operated in the particular orientations, so that these terms are not construed as limiting the embodiments of the present application.

At present, from the perspective of the development of the market situation, power batteries are increasingly more widely used. Power batteries are not only applied in energy storage power source systems such as water, fire, wind, and solar power stations, but also widely applied in electric transportation tools, such as electric bicycles, electric motorcycles, and electric vehicles, as well as many fields, such as military equipment and aerospace. With the continuous expansion of the market demand of the power batteries, the quantity demand of aluminum cases used for packaging is also increasing.

In a battery assembling process, aluminum cases need to be separated and loaded in empty trays so that manipulators or other picking apparatuses can accurately pick up the aluminum cases and transfer them to the battery assembling process. Generally, aluminum case manufacturers will provide a whole box of aluminum case packages containing a certain number of aluminum cases, which requires separation of the aluminum cases to adapt to battery assembling. In a traditional aluminum case separation process, a pure manual or semi-automatic method is usually used. For example, the aluminum case package is manually removed and placed upside down on a production line; as the production line operates, online workers will separate partially overlapping aluminum cases so that the aluminum cases are arranged in an orderly manner to facilitate subsequent mechanical loading. This method mainly relies on manual operation, which is prone to irregular operations, resulting in bumps and scratches between aluminum cases. In addition, the labor cost is also high, and the separation efficiency of the aluminum case is also reduced, which is unable to adapt to the production pace of power batteries.

Based on the above considerations, in order to solve the problems of bumps and scratches during the case separation process, as well as the low separation efficiency, the inventor designed an automatic case separating apparatus after in-depth research, including: a feeding mechanism, a delivery mechanism, and a combing mechanism. The feeding mechanism is used for receiving and delivering unpacked cases. The delivery mechanism is used for receiving and delivering the cases output by the feeding mechanism, and when the feeding mechanism delivers the cases to the delivery mechanism, the cases are in a tipped state on the delivery mechanism. The combing mechanism is used for combing and separating at least two overlapping cases on the delivery mechanism.

In the separation process, the unpacked cases are placed upside down on the feeding mechanism, the feeding mechanism is used to deliver a whole box of cases to the delivery mechanism, and it is ensured that the cases are delivered in a tipped posture on the delivery mechanism. Then, the combing mechanism is used to separate at least two overlapping cases, so that the cases on the production line are separate individuals separated from each other. The separated cases are delivered to a loading process under the action of the delivery mechanism. This enables automatized operation of case separation, replacing manual operations, which is conducive to speeding up the pace, improving separation efficiency and separation quality.

The automatic case separation apparatus disclosed in the embodiment of the present application can be used for, but is not limited to, the separation of aluminum cases of power batteries, and can also be used for separation of other cases, such as separation of mobile phone cases. In this regard, as long as the case loading operation is involved, the automatic case separating apparatus of the present application can be used.

According to some embodiments of the present application, referring to FIG. 1, the present application provides an automatic case separating apparatus 100. The automatic case separating apparatus 100 includes a feeding mechanism 110, a delivery mechanism 120, and a combing mechanism 130. The feeding mechanism 110 is used for receiving and delivering a plurality of cases 600 after unpacked, the plurality of cases 600 maintaining a first state before unpacked. The delivery mechanism 120 is used for receiving and delivering the cases 600 output by the feeding mechanism 110. When the feeding mechanism 110 delivers the cases 600 to the delivery mechanism 120, the cases 600 are in a second state on the delivery mechanism 120. The combing mechanism 130 is used for combing and separating at least two overlapping cases 600 on the delivery mechanism 120.

The feeding mechanism 110 refers to a device having a certain carrying capacity and delivering function. In this way, when the plurality of cases 600 after unpacked are placed on the feeding mechanism 110, the feeding mechanism 110 can sufficiently support the cases 600, without causing the material collapse and affecting the delivery of the cases 600.

The feeding mechanism 110 can receive incoming materials in an automatic manner or in a manual manner. For example, the unpacked cases 600 are grabbed to the feeding mechanism through a device such as a multi-axis manipulator to realize receiving of the feeding mechanism 110; or the unpacked cases 600 are manually placed upside down on the feeding mechanism 110. For the delivery of the feeding mechanism 110, a telescopic function of a device such as a cylinder, a hydraulic cylinder, and an electric cylinder can be used to realize the delivery of the cases 600. Alternatively, a rotation function of a device such as a motor can be used to drive the cases 600 to move to the delivery mechanism 120. At this time, the structure of this type of feeding mechanism 110 can be designed as, but is not limited to, a belt delivery device, a roller wheel delivery device, a roller delivery device, and the like.

The unpacked cases 600 refer to: in order to facilitate delivery of incoming materials, suppliers or distributors usually package a plurality of cases 600 into a package or a box-like structure. At this time, in the separation process, the package or box structure on the surface of the incoming materials is removed through machinery or manually, the remaining cases 600 are the unpacked cases 600.

Similarly, the delivery mechanism 120 refers to a device having a certain carrying capacity and conveying function. In this way, when receiving the cases of the feeding mechanism 110, the delivery mechanism 120 can sufficiently support the cases 600, without causing the material collapse and affecting the delivery of the cases 600.

The manner in which the delivery mechanism 120 receives the cases on the feeding mechanism 110 may be direct reception or indirect reception. For example, when an input end of the delivery mechanism 120 is located below an output end of the feeding mechanism 110, the cases 600 drop directly from the output end of the feeding mechanism 110 to the delivery mechanism 120 to realize direct reception of the delivery mechanism 120. Alternatively, when a transfer structure, such as a belt conveyor and a sliding rail, is arranged between the delivery mechanism 120 and the feeding mechanism 110, the transfer structure is used for realizing the reception of the delivery mechanism 120.

Likewise, for the delivery of the delivery mechanism 120, a telescopic function of a device such as a cylinder, a hydraulic cylinder, and an electric cylinder can be used to realize the delivery of the cases 600. Alternatively, a rotation function of a device such as a motor can further be used to drive the cases to move to the delivery mechanism 120. At this time, the structure of this type of delivery mechanism 120 can be designed as, but is not limited to, a belt delivery device, a roller wheel delivery device, a roller delivery device, and the like.

The case 600 has at least two states: a first state and a second state. The first state is determined by a packaging state of the case 600 and may be an upright or tipped state, and the second state may be a tipped or upright state that is different from the first state. Of course, it is understandable that the first state is a state in which the plurality of cases 600 are maintained with each other before unpacking; the second state is a state of the cases 600 that facilitates the combing mechanism 130 to separate at least two overlapping cases 600 from each other, so that the cases 600 are spaced apart. The "tipped state" should be understood as that the case 600 has a surface with a large area, and the case 600 is in the tipped state when the surface is placed on the feeding mechanism 110 in a lay-down or fit manner. For example, assuming that the case 600 is a square case, when the case 600 lies down on the feeding mechanism 110 with a larger surface, it is in a tipped state.

When the case 600 is transferred from the feeding mechanism 110 to the delivery mechanism 120, it is in the second state on the delivery mechanism 120, which can be implemented in many manners, for example: completing the second state in advance on the feeding mechanism 110, and the case 600 in the second state is delivered to the delivery mechanism 120 by the feeding mechanism 110; or performing a corresponding action on the feeding mechanism 110, so that the case 600 is in the second state on the delivery mechanism 120; or, performing the action after the case 600 in the first state is delivered to the delivery mechanism 120, so that it is converted from the first state to the second state, and so on.

The cases 600 may partially overlap each other when they are tipped, for example, a part of the latter case 600 rests on the previous case 600, or the like. Of course, there may also be three or more than three overlapping cases. To this end, the present application provides a combing mechanism 130 to comb the overlapping cases 600 so that the cases 600 on the delivery mechanism 120 are separated from each other.

The combing mechanism 130 refers to a device that can separate at least two overlapping cases 600 so that the cases 600 are separated from each other. For example, the combing mechanism 130 may be designed as a scraper, a baffle, and another structure. The delivery function of the delivery mechanism 120 is used to deliver the overlapping cases 600 under the scraper or baffle to scrape off or block the upper case 600. Alternatively, the combing mechanism 130 may also be designed as a plurality of movable slot box structures, only one case 600 can be placed in a slot box, and in this way, when the overlapping cases 600 move to the slot box, the lower case 600 is taken away by a slot box, while the upper case 600 is intercepted and enters another slot box, and so on. It should be noted that the examples listed above are only used for illustrating the combing function of the combing mechanism 130 and cannot be used as a structural limitation of the combing mechanism 130 in the present application. Any structure is available as long as the structure can separate the overlapping cases 600.

For ease of understanding, the embodiment of the present application is described by taking the first state being the upright state and the second state being the tipped state as an example, but this should not be understood as a limitation of the present application.

The feeding mechanism 110 is used to deliver a whole box of cases 600 to the delivery mechanism 120, and it is ensured that the cases 600 are delivered in a tipped posture on the delivery mechanism 120. Then, the combing mechanism 130 is used to separate at least two overlapping cases 600, so that the cases 600 on the production line are separate individuals separated from each other. The separated cases 600 are delivered to a loading process under the action of the delivery mechanism 120. In this way, the automatic case separating apparatus 100 of the present application can replace manual work, so that the packaged cases 600 are automatically and orderly separated, and automatic and effective paper removal operations are performed, thereby speeding up the operation pace, and improving the separation efficiency and separation quality.

According to some embodiments of the present application, referring to FIG. 1, the first state is defined as the upright state of the case 600; and the second state is defined as the tipped state of the case 600.

The "upright state" should be understood as a corresponding posture of the case 600 having a larger surface placed vertically or in an upright manner on the feeding mechanism 110.

The "tipped state" should be understood as that the case 600 has a surface with a large area, and the case 600 is in the tipped state when the surface is placed on the feeding mechanism 110 in a lay-down or fit manner.

Defining the first state as the upright state and defining the second state as the tipped state facilitate subsequent combing of the overlapping cases 600 and ensure stable separation operation of the cases.

Figure 2:
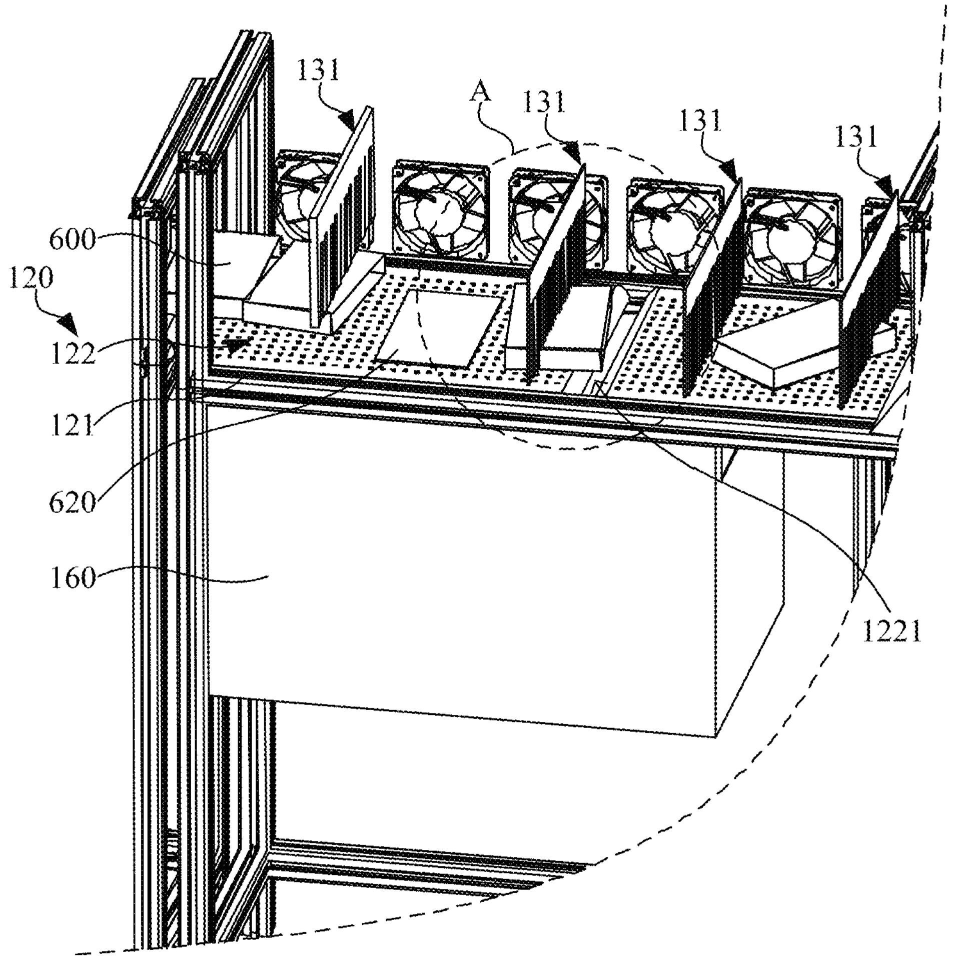
FIG. 2 is a schematic partial structural diagram of an automatic case separating apparatus according to some embodiments of the present application.

According to some embodiments of the present application, referring to FIG. 1 and FIG. 2, the input end of the delivery mechanism 120 is arranged adjacent to the output end of the feeding mechanism 110, and in a height direction H of the delivery mechanism 120, the input end of the delivery mechanism 120 is lower than the output end of the feeding mechanism 110.

The input end of the delivery mechanism 120 is arranged adjacent to the output end of the feeding mechanism 110, and the "adjacent" is relative to the input end of the feeding mechanism 110, having a purpose of ensuring that the case 600 on the feeding mechanism 110 can be stably delivered to on the delivery mechanism 120.

At the same time, the input end of the delivery mechanism 120 is lower than the output end of the feeding mechanism 110 in the height direction H of the delivery mechanism 120, and the purpose is that the case 600 placed upside down on the feeding mechanism 110 can be automatically tipped in the direction toward the delivery mechanism 120 respectively by utilizing a drop height between the two, so that the cases 600 are in the "tipped state" on the delivery mechanism 120. There is no limit for the specific drop height value, as long as the cases 600 are tipped forward when they are delivered from the feeding mechanism 110 to the delivery mechanism 120.

In addition, the cases 600 are tipped in the direction toward the delivery mechanism 120, that is, tipped forward. In this way, even if the tipped cases 600 overlap each other, they can be easily separated by the combing mechanism 130. For example, the overlapping cases 600 can be scraped off by the combing mechanism 130 under the delivery of the delivery mechanism 120, and the like.

The input end of the delivery mechanism is lower than the output end of the feeding mechanism 110 so that there is a certain drop height between the two. In this way, when the cases 600 are delivered from the feeding mechanism 110 to the delivery mechanism 120, a forward tilting action may occur, so as to ensure that the cases 600 are in a "tipped state" on the delivery mechanism 120, thereby ensuring the stable operation of the separation operation of the cases 600.

Figure 3:
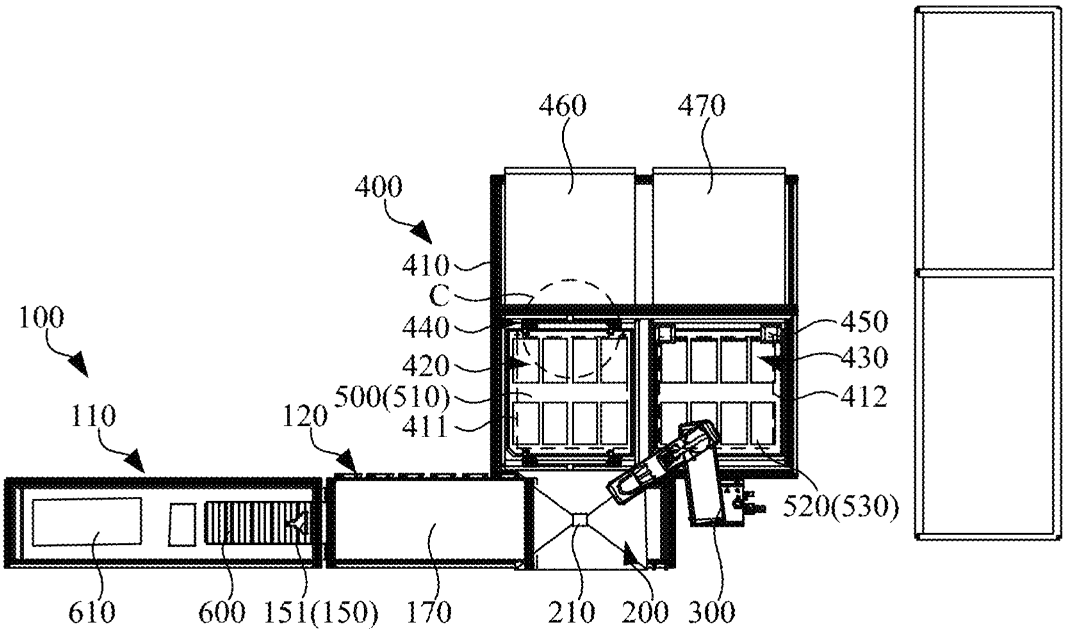
FIG. 3 is a schematic structural diagram of a case separation system according to some embodiments of the present application.

According to some embodiments of the present application, referring to FIG. 3, the automatic case separating apparatus 100 further includes a tipping structure 150. The tipping structure 150 is used for driving the cases 600 on the feeding mechanism 110 to tip toward the delivery mechanism 120.

There are many designs for the tipping structure 150 to drive the cases 600 to tip toward the delivery mechanism 120. For example, the tipping structure 150 can be designed as an air blowing or air blasting structure to blow or blast the cases 600 to be tipped toward the delivery mechanism 120. Alternatively, the tipping structure 150 may also be designed as a combination structure of a roller wheel and a lever, and the roller wheel is used to drive the lever to rotate, so that the lever moves the top of the cases 600 in the direction toward the delivery mechanism 120 so that the case is tipped, and the like.

The present application provides the tipping structure 150 to cooperate with the delivery mechanism 120 and the feeding mechanism 110 having the drop height, so as to ensure that the cases 600 on the delivery mechanism are in the tipped state, thereby ensuring the continuous and stable operation of the separation operation of the cases 600.

According to some embodiments of the present application, referring to FIG. 3, the tipping structure 150 includes a nozzle 151. The nozzle 151 is located above the feeding mechanism 110, and a spray end of the nozzle 151 is arranged toward the delivery mechanism 120.

The nozzle 151 is located above the feeding mechanism 110, and its spray end is arranged toward the delivery mechanism 120, so that an air outlet direction of the nozzle 151 is the direction toward the delivery mechanism 120 and the cases 600 are blown down by the nozzle 151. Of course, in order to improve the blowing effect, the nozzle 151 may be placed in an oblique manner so that the air outlet direction is blowing obliquely downward from the top of the case 600.

At the same time, the nozzle 151 should be arranged above the feeding mechanism 110 at a height higher than the case 600 to allow the case 600 to pass through. In addition, the nozzle 151 can be fixed on the feeding mechanism 110 through a mounting structure; and it can also be fixed on the delivery mechanism 120 through a mounting structure, or the like.

The nozzle 151 is arranged above the feeding mechanism 110. During the separation process, air or another gas is introduced into the nozzle 151 so that the cases 600 are blown down under the action of the nozzle 151 to ensure that the cases 600 on the delivery mechanism are all in the tipped state.

Figure 4:
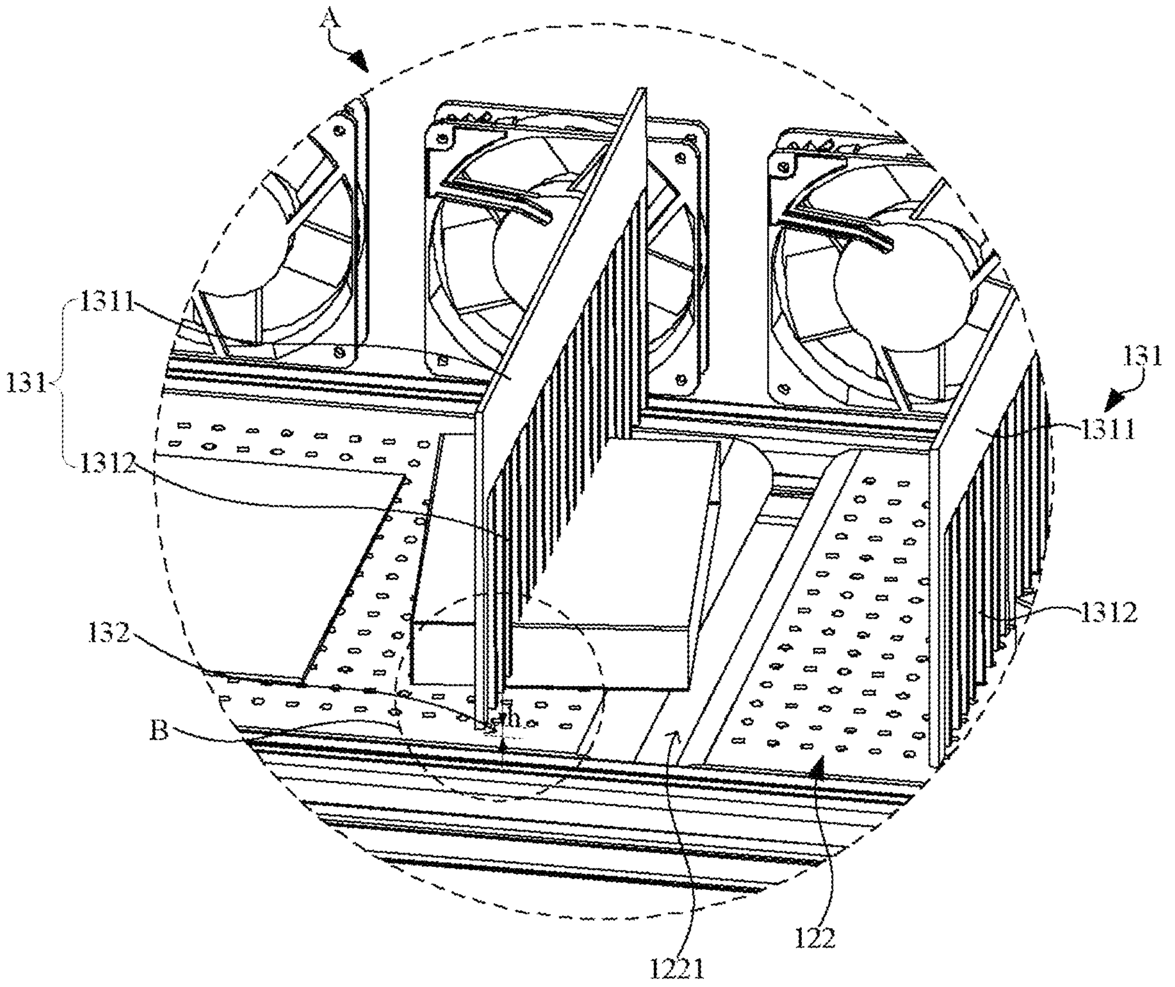
FIG. 4 is a schematic enlarged diagram of a structure at a circle A in FIG. 2.

According to some embodiments of the present application, referring to FIG. 4, the combing mechanism 130 includes a combing member 131 located above the delivery mechanism 120. A combing interval 132 is formed between the combing member 131 and the delivery mechanism 120. The combing intervals 132 are used for allowing one case 600 in the second state to pass through.

The combing interval 132 allows one case 600 in the second state (such as the tipped state) to pass through, with the purpose of separating at least two overlapping cases 600. For example, when two overlapping cases 600 pass through the combing interval 132, the combing interval 132 only allows one case 600 in the tipped state to pass through, and therefore, one of the two overlapping cases 600 will be intercepted by the combing member 131, and the other one is allowed to pass through smoothly. The intercepted case 600 is combed into a case 600 in the tipped state. Therefore, the intercepted case 600 can be allowed to pass through the combing interval 132 again.

There are many designs for the size of the combing intervals 132. For example, the size of the combing intervals 132 is less than or equal to the thickness of the case 600 in the tipped state; or the size of the combing intervals 132 is greater than the thickness of the case 600 in the tipped state, but it should be less than 2 times the thickness of the case 600 in the tipped state, and the like. When the size of the combing interval 132 is smaller than the thickness of the case 600 in the tipped state, one end of the combing member 131 facing the delivery mechanism 120 should be designed as a flexible or elastic structure so that the case 600 can be transported by the delivery mechanism 120 to pass through the combing interval 132 smoothly.

Arranging the combing interval 132 between the combing member 131 and the delivery mechanism 120 separates the overlapping cases 600 in a manner of allowing only one case 600 in the second state (such as the tipped state) to pass through, so that the cases 600 sequentially pass through the combing interval 132 one by one.

Figure 5:
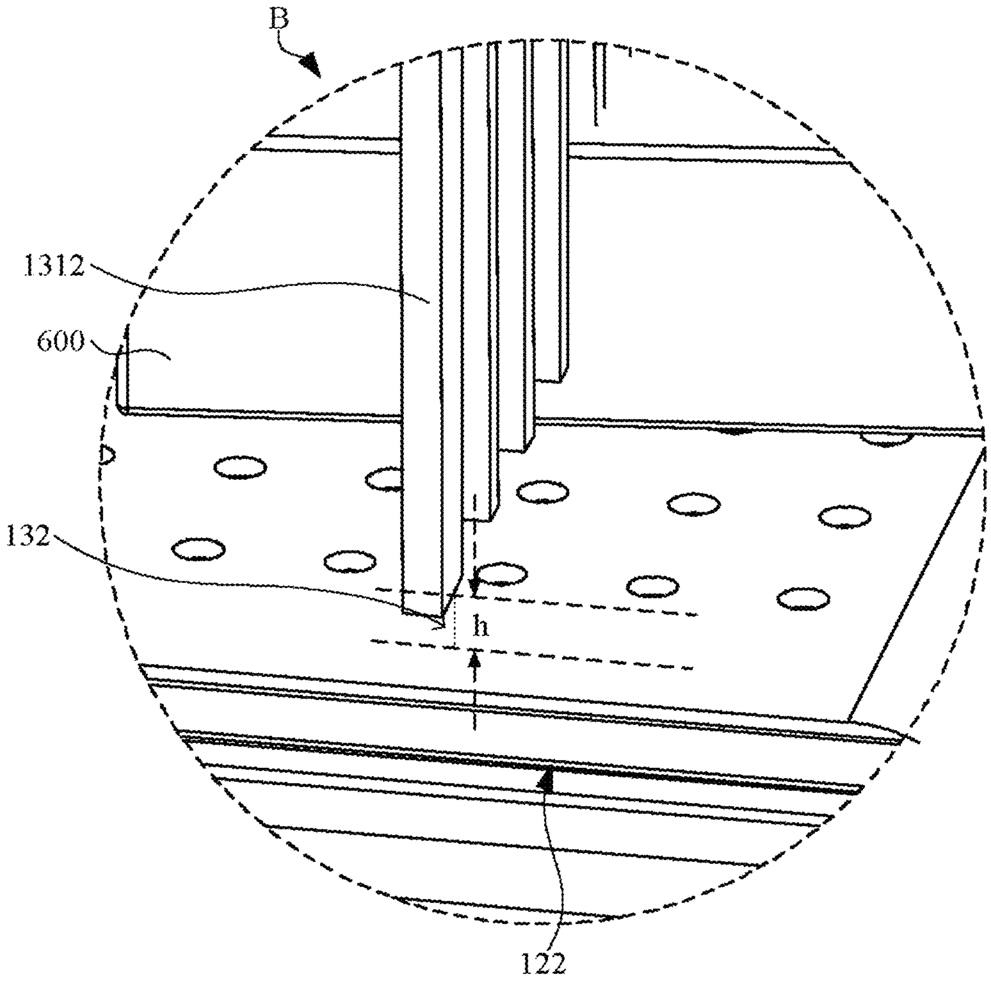
FIG. 5 is a schematic enlarged diagram of a structure at a circle B in FIG. 4.

According to some embodiments of the present application, referring to FIG. 5, there are at least two combing members 131. All the combing members 131 are arranged at an interval in a delivery direction L of the delivery mechanism 120. Heights h of all the combing intervals 132 show a decreasing trend in the delivery direction L of the delivery mechanism 120.

The quantity of the combing members 131 may be two, three, or more, which is not specifically limited in the present application. Of course, during actual separation operations, the specific quantity may be determined according to actual requirements and the actual length of the delivery mechanism 120. At the same time, the magnitude of a distance between two adjacent combing members 131 does not need to be specifically limited, and the actual distance may be adjusted according to the actual size of the case 600.

In addition, the heights h of the combing interval 132 show a decreasing trend in the delivery direction L of the delivery mechanism 120. It can be understood that the farther away from the feeding mechanism 110, the smaller the size of the combing interval 132, which can ensure that the cases 600 on the output end of the delivery mechanism 120 are separated as separate individuals, which effectively prevents the delivery mechanism 120 from outputting overlapping cases 600 to the outside. At the same time, the combing interval 132 close to the feeding mechanism 110 is larger. Such a design can slow down the transmission pressure at the input end of the delivery mechanism 120 and avoid a large number of cases 600 from accumulating at the input end of the delivery mechanism 120 and causing the delivery of the cases 600 to be stuck.

Of course, a detection device may also be arranged on the output end of the delivery mechanism 120. For example, a through-beam sensor is used, and if it is sensed that another case 600 is overlapped on the case 600, the operator can be notified through an alarm, and the overlapped case 600 can be processed in time to avoid affecting the subsequent processes.

At least two combing members 131 are arranged at an interval in the delivery direction L of the delivery mechanism 120 to strengthen the combing effect on the cases 600, improve the combing effect of the cases 600, and prevent the delivery mechanism 120 from delivering overlapping cases 600 outwards to be unable to perform the separation operation normally.

According to some embodiments of the present application, referring to FIG. 4, the combing member 131 includes a main body part 1311 and a combing part 1312 having an elastic deformation function. The combing part 1312 is arranged on the main body part 1311 and forms the combing interval 132 with the delivery mechanism 120.

When one case 600 in the tipped state passes through the combing interval 132, the combing part 1312 may be in contact with the surface of the case 600. For example, the size of a certain combing interval 132 is smaller than the thickness of one case 600 in the tipped state. At this time, the combing part 1312 has the elastic deformation function, and therefore, the case 600 may push the combing part 1312 when passing through, causing it to undergo elastic deformation. This ensures that one case 600 can pass through smoothly and at the same time ensures that the combing part 1312 is in close contact with the surface of the case 600, so that another case 600 on the surface of the case 600 can be scraped off.

At the same time, there may be one or a plurality of the combing parts 1312. When there are a plurality of combing parts 1312, the plurality of combing parts 1312 are arranged at an interval on the main body part 1311 in the length direction of the main body part 1311. In addition, in the delivery direction L of the delivery mechanism 120, the elasticity of the combing parts 1312 on the combing members 131 may remain consistent or different. For example, in the delivery direction L of the delivery mechanism 120, the elasticity of the combing parts 1312 gradually becomes smaller, and so on.

The connection method between the combing part 1312 and the main body part 1311 may be, but is not limited to, welding, bonding, fusion welding, snapping, pinning, integrated molding, and the like. The integrated molding involves injection molding, cutting, extrusion, and other processes.

The elastically deformable combing part 1312 is arranged at one end of the combing member 131 facing the delivery mechanism 120, so that the contact between the combing member 131 and the case 600 is an elastic contact, which ensures the smooth passing of a case 600, and further ensures that the combing part 1312 is in close contact with the surface of the case 600 so that another case 600 on the surface of the case 600 can be scraped off, thereby further improving the combing effect of the combing mechanism 130.

According to some embodiments of the present application, referring to FIG. 1, the automatic case separating apparatus 100 further includes a removing mechanism 140. The removing mechanism 140 is used for removing a spacer 620 for isolating two adjacent cases 600 on the delivery mechanism 120.

The removing mechanism 140 refers to a device that can remove the spacer 620 from the delivery mechanism 120, such as but not limited to an air blower, a suction ventilator, a shaker (such as a vibration motor); or a push plate combination structure driven by a cylinder or a hydraulic cylinder, or the like. When the removing mechanism 140 removes the spacer 620 in a blowing and suction manner, its scope of action may cover most or all of the delivery mechanism 120. In this way, the removing mechanism 140 can remove a part of the spacer 620 that has just entered the delivery mechanism 120 (this part of the spacer 620 is exposed when the case 600 is converted to the second state), and can also remove the spacer 620 in the combing process. Of course, the spacer 620 exposed after each case 600 is separated by the combing can also be removed, and so on. In addition, it should be noted that while the combing mechanism 130 combs to separate the overlapping cases 600, it can also comb out the spacer 620 attached to the case 600.

The spacer 620 is used for isolating two adjacent cases 600 to prevent direct contact between the cases 600 to cause scratches, grinding, and other phenomena, so as to achieve surface protection of the cases 600. The spacer 620 may be, but is not limited to, isolation paper, sponge pad, foam sheet, rubber sheet, and other structures.

When the spacer 620 is exposed on the delivery mechanism 120, the removing mechanism 140 is used to remove the spacer 620 from the delivery mechanism 120 to avoid the presence of the spacer 620 from interfering with the loading of the case 600, so as to ensure the stable operation of separation of the cases 600; at the same time, it is also beneficial to achieve recycling of the spacer 620 to realize resource recycling.

According to some embodiments of the present application, referring to FIG. 2, the delivery mechanism 120 includes a delivery frame 121 and at least two conveying assemblies 122 arranged at an interval on the delivery frame 121. A removing interval 1221 is formed between two adjacent conveying assemblies 122, and the removing mechanism 140 is used for removing the spacer 620 from the removing interval 1221.

The size of the removing interval 1221 may be determined according to actual requirements, as long as the spacer 620 can pass through under the action of the removing mechanism 140. Of course, when designing the removing interval 1221, it should also be noted that the case 600 cannot fall from the removing interval 1221.

The structure of the conveying assembly 122 may be designed as a belt conveying device, or as a roller conveying device, or the like, as long as it can convey the cases 600. At the same time, the removing mechanism 140 may be designed as an air blasting device, or may be designed as a vacuum evacuation device, or the like. When the removing mechanism 140 is an air blasting device, the removing mechanism 140 can blow the spacer 620 into the removing interval 1221. When the removing mechanism 140 is a vacuum evacuation device, the removing mechanism 140 sucks the spacer 620 into the removing interval 1221 by using vacuum suction.

The removing interval 1221 between two adjacent conveying assemblies 122 allows the spacer 620 to be smoothly removed under the action of the removing mechanism 140, thereby further ensuring the stable operation of the separation operation of the cases 600.

According to some embodiments of the present application, referring to FIG. 2, the automatic case separating apparatus 100 further includes a recycling box 160. The recycling box 160 is located below the conveying assembly 122 and is in communication with the removing interval 1221.

The recycling box 160 is located below the conveying assembly 122, and may or may not be connected to the conveying assembly 122. When the recycling box 160 is not connected to the conveying assembly 122, the recycling box 160 can be placed directly below the removing interval 1221, and an open end of the recycling box 160 can be directly aligned with the removing interval 1221, and so on.

Arranging the recycling box 160 below the conveying assembly 122 to collect the spacers 620 removed from the removing interval 1221 facilitates unified processing of the spacers 620.

According to some embodiments of the present application, referring to FIG. 3, the automatic case separating apparatus 100 further includes a protective enclosure 170. The protective enclosure 170 is arranged above the delivery mechanism 120 and the combing mechanism 130 to at least provide protection for the combing operation on the delivery mechanism 120.

The protective enclosure 170 is arranged above the delivery mechanism 120 and the combing mechanism 130 to provide protection for the operations of the delivery mechanism 120 and the combing mechanism 130 and prevent external debris from falling on the delivery mechanism 120 and the combing mechanism 130 and causing the device to be stuck or disturbing the separation of the cases 600. In addition, if the automatic separation apparatus 100 is equipped with the removing mechanism 140, the protective enclosure 170 is arranged above the delivery mechanism 120 to provide protection for the spacers 620 on the delivery mechanism 120 and prevent the spacers 620 from flying apart in the removing process to cause chaos of on-site management.

The mounting method of the protective enclosure 170 above the delivery mechanism 120 may be, but is not limited to, bolted connection, clamping, riveting, welding, and the like.

Arranging the protective enclosure 170 above the delivery mechanism 120 and the combing mechanism 130 provides effective protection for the operations on the delivery mechanism 120 and ensures that the automatic case separating apparatus 100 proceeds stably and orderly.

According to some embodiments of the present application, referring to FIG. 3, the present application further provides a case separation system, including: the automatic case separating apparatus 100 in any of the above solutions, a discharging mechanism 200, a tray supplying apparatus 400, and a material picking apparatus 300. The discharging mechanism 200 is used for receiving and delivering cases 600 output by the delivery mechanism 120. The tray supplying apparatus 400 is used for supplying an empty tray 500. The material picking apparatus 300 is used for transferring the cases 600 on the discharging mechanism 200 to the empty tray 500.

When the case 600 is delivered to the discharging mechanism 200, the material picking apparatus 300 will transfer the case 600 on the discharging mechanism 200 to the empty tray 500 to complete the final process of separation of the case 600. In the transferring process, the material picking apparatus 300 can pick up the case 600 by grasping, clamping, sucking, and the like. For example, the material picking apparatus 300 may be, but is not limited to, a manipulator, a suction cup 442, or another device.

In addition, in order to ensure that the material picking apparatus 300 accurately transfers the case 600 to the empty tray 500, a detection module 210 can be arranged on the discharging mechanism 200. The detection module 210 is used to detect whether the case 600 exists on the discharging mechanism 200, and acquire position information of the case 600 on the discharging mechanism 200, so that the material picking apparatus 300 starts to act, accurately picks up the case 600, and accurately transfer it to the empty tray 500. The detection module 210 may be, but is not limited to, a CCD visual assembly, or the like.

In the separation process, the unpacked cases 600 are placed upside down on the feeding mechanism 110, the feeding mechanism 110 is used to deliver a whole box of cases 600 to the delivery mechanism 120, and it is ensured that the cases 600 are delivered in a tipped posture on the delivery mechanism 120. Then, the combing mechanism 130 is used to separate at least two overlapping cases 600, so that the cases 600 on the production line are separate individuals separated from each other. The separated cases 600 are delivered to a loading process under the action of the delivery mechanism 120. When the case 600 is delivered to the discharging mechanism 200, the case 600 on the discharging mechanism 200 is transferred to the empty tray 500 in the tray supplying apparatus 400 through the material picking apparatus 300 to complete the automatic separation operation of the cases 600. In this way, the automatic case separating apparatus 100 of the present application can replace manual work, so that the packaged cases 600 are automatically and orderly separated, and automatic and effective paper removal operations are performed, thereby speeding up the operation pace, and improving the separation efficiency and separation quality.

According to some embodiments of the present application, referring to FIG. 3, the tray supplying apparatus 400 includes a rack 410 and a first lifting mechanism 420, a second lifting mechanism 430, and a moving mechanism 440 that are arranged on the rack 410. The first lifting mechanism 420 is used for lifting an empty tray stack 510 so that the uppermost empty tray 500 in the empty tray stack 510 is moved to a tray supplying station 411. The second lifting mechanism 430 is used for lowering a non-empty tray stack 530 to clear a loading station 412. The moving mechanism 440 is used for transferring the empty tray 500 on the tray supplying station 411 to the loading station 412.

The empty tray stack 510 is a pile-like structure formed by stacking a plurality of empty trays 500 together. The empty tray 500 is a container structure that accommodates a plurality of cases 600. Of course, to avoid the cases 600 in the tray from colliding with each other, a plurality of compartments may be arranged in the empty tray 500 to allow the plurality of cases 600 to be placed such that they are separated from each other. When the empty tray 500 is loaded with a preset number (such as full) of the cases 600, the tray is a non-empty tray 520. The non-empty tray stack 530 is a pile-like structure formed by a plurality of non-empty trays 520 stacked together.

Both the first lifting mechanism 420 and the second lifting mechanism 430 have various structural designs. For example, both the first lifting mechanism 420 and the second lifting mechanism 430 may be designed as air cylinders, hydraulic cylinders, electric cylinders, and other devices. Of course, it may also be designed as a combined structure of a motor and a transmission structure. For example, when the transmission structure is an engaged structure of a gear and a rack, the motor drives the gear to rotate and drives the rack to move vertically, so as to drive the empty tray stack 510 to lift, and the like. When the transmission structure is a matching structure of a driving gear, a driven gear, and a chain, the motor drives the driving gear to rotate and drives the chain to rotate between the driving gear and the driven gear, so that the chain drives the empty tray stack 510 to move up and down.

In addition, the tray supplying station 411 and the loading station 412 are two regions arranged side by side on the rack 410, and the moving mechanism 440 can transfer the empty tray 500 between the two regions. At the same time, the tray supplying station 411 and the loading station 412 can be maintained at the same height on the rack 410, or they may not be at the same height. For example, the tray supplying station 411 is located higher than the loading station 412, and the like.

In a loading process, the first lifting mechanism 420 drives the empty tray stack 510 to rise to the tray supplying station 411, and the second lifting mechanism 430 drives the non-empty tray stack 530 to descend to vacate the loading station 412. The moving mechanism 440 transfers the empty tray 500 on the uppermost layer of the empty tray stack 510 on the tray supplying station 411 to the loading station 412. Then, the material picking apparatus 300 transfers the cases 600 on the discharging mechanism 200 to the empty tray 500 on the loading station 412, so as to realize an automatic loading operation.

Figure 6:
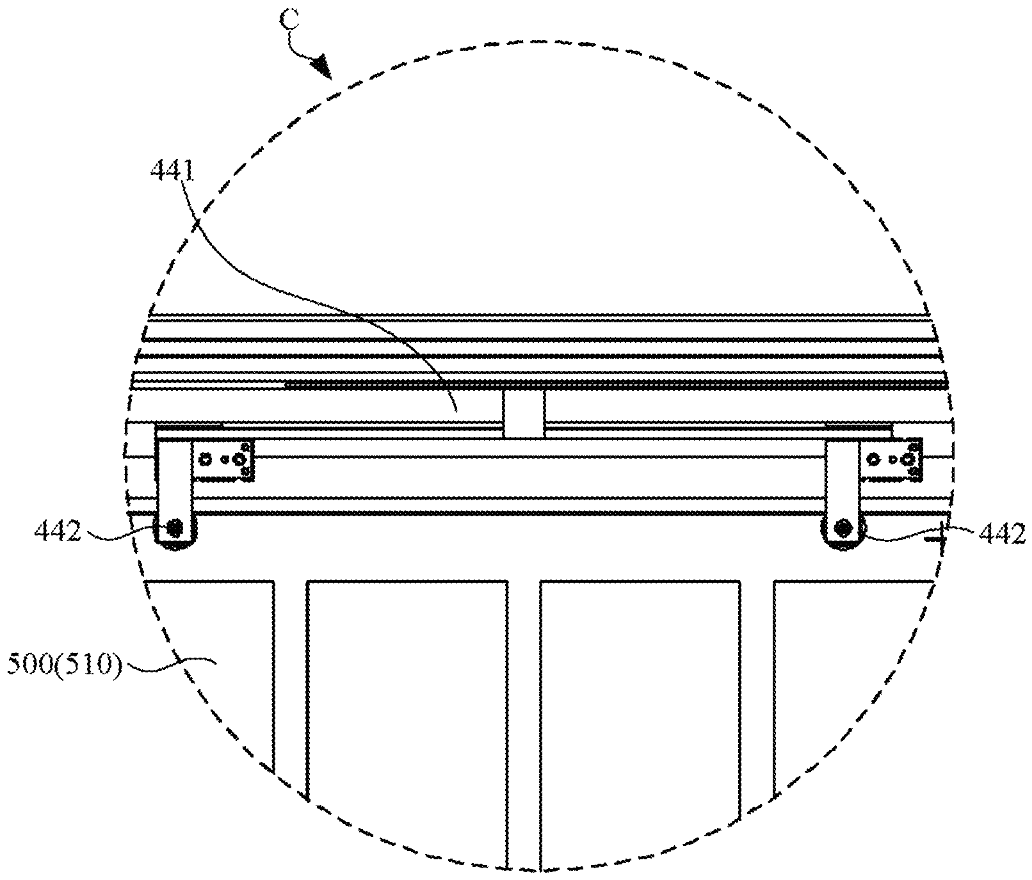
FIG. 6 is a schematic enlarged diagram of a structure at a circle C in FIG. 3.

According to some embodiments of the present application, referring to FIG. 6, the moving mechanism 440 includes a sliding rail 441 and a suction cup 442. The sliding rail 441 is arranged on the rack 410 and extends in a direction from the tray supplying station 411 to the loading station 412. The suction cup 442 is slidably arranged on the sliding rail 441 and is used for sucking the empty tray 500 on the tray supplying station 411.

The manner of fixing the sliding rail 441 on the rack 410 may be, but is not limited to, bolted connection, clamping, riveting, welding, pinning, and the like. In addition, when the suction cup 442 sucks the empty tray 500, it needs to be connected to an external vacuum device.

The sliding rail 441 is used to enable the suction cup 442 to reciprocate stably between the tray supplying station 411 and the loading station 412, ensuring that the empty tray 500 is transferred from the tray supplying station 411 to the turntable station in a timely manner, thereby ensuring the continuous and stable operation of the separation operation.

According to some embodiments of the present application, referring to FIG. 3, the tray supplying apparatus 400 further includes a positioning module 450. The positioning module 450 is used for acquiring position information of the empty tray 500 on the loading station 412 to control the material picking apparatus 300 to transfer the cases 600 to the empty tray 500 on the loading station 412.

The positioning module 450 has a variety of options, as long as it can obtain the position information of the empty tray 500 on the loading station 412. For example, the positioning module 450 is a CCD vision component, and the like. In addition, when controlling the material picking apparatus 300 to transfer the cases 600, the positioning module 450 sends the acquired position information to the control module (such as an editable logic controller) in the form of an electrical signal; after the control module receives the signal, the material picking apparatus 300 is controlled to act and accurately transfer the cases 600 to the empty tray 500.

Location information of the empty tray 500 is accurately acquired through the positioning module 450, and the positioning information is provided for the material picking apparatus 300 to ensure that the material picking apparatus

300 accurately places the cases 600 into the empty tray 500, which is beneficial to improving the separation quality of the cases 600.

According to some embodiments of the present application, referring to FIG. 3, the tray supplying apparatus 400 further includes a material preparation mechanism 460. The material preparation mechanism 460 is used for placing the empty tray stack 510 and delivering the empty tray stack 510 to the first lifting mechanism 420.

The material preparation mechanism 460 may be designed as a belt delivering device. For example, when all the empty trays 500 on the first lifting mechanism 420 are transferred to the second lifting mechanism 430 by a transferring mechanism, the belt delivering device delivers the new empty tray stack 510 through a belt to the first lifting mechanism 420. Of course, the material preparation mechanism 460 may also be designed as another device having a delivering function.

Through the material preparation mechanism 460, the empty tray stack 510 on the first lifting mechanism 420 is replenished in time to ensure continuous and stable operation of the separation operation of the cases 600.

According to some embodiments of the present application, referring to FIG. 3, the tray supplying apparatus 400 further includes a tray output mechanism 470. The tray output mechanism 470 is used for receiving and outputting the non-empty tray stack 530 output from the second lifting mechanism 430.

The tray output mechanism 470 may also be designed as a belt delivering device. For example, when the non-empty tray stack 530 on the second lifting mechanism 430 cannot continue to descend to vacate the loading station 412, the belt delivering device delivers the non-empty tray stack 530 to the tray output mechanism 470. Of course, the tray output mechanism 470 may also be designed as another device having a delivering function.

Through the tray output mechanism 470, the non-empty tray stack 530 on the second lifting mechanism 430 is output in a timely manner to ensure continuous and stable operation of the separation operation of the cases 600.

Figure 7:
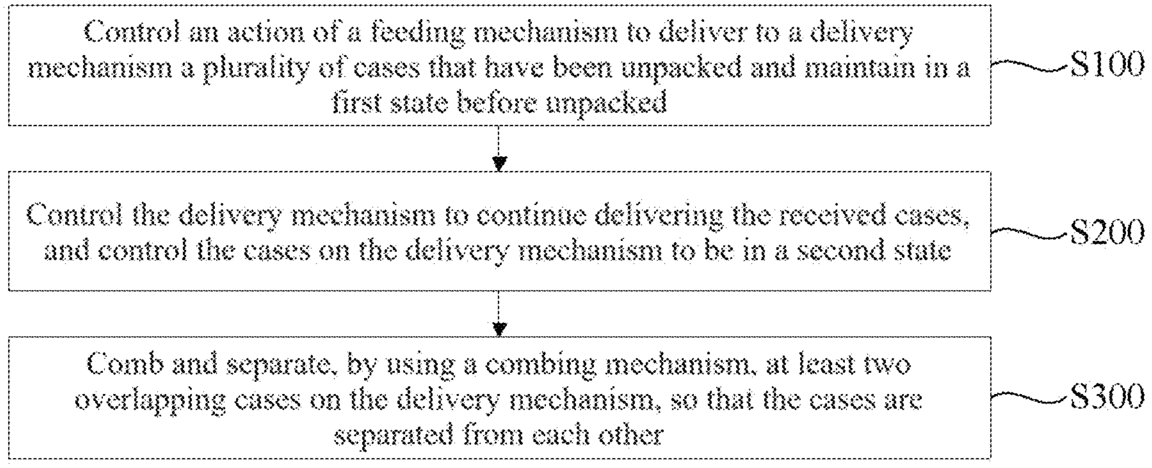
FIG. 7 is a schematic flow chart of an automatic case separating method according to some embodiments of the application.

According to some embodiments of the present application, referring to FIG. 1 and FIG. 7, the present application further provides an automatic case separating method, which adopts the automatic case separating apparatus 100 in any one of the above solutions. The method includes the following steps of:

- S100: Controlling an action of a feeding mechanism 110 to deliver to a delivery mechanism 120 a plurality of cases 600 that have been unpacked and maintain in a first state before unpacked;
- S200: Controlling the delivery mechanism 120 to continue delivering the received cases 600, and controlling the cases 600 on the delivery mechanism 120 to be in a second state; and
- S300: Combing, by using a combing mechanism 130, at least two overlapping cases 600 on the delivery mechanism 120, so that the cases 600 are separated from each other.

When controlling the action of the feeding mechanism 110 in step S100, the feeding mechanism 110 may be kept operating continuously. The action may also be operated according to whether there are cases 600 on the feeding mechanism 110. For example, an incoming material sensor is arranged on the feeding mechanism 110, and when the cases 600 are placed on the feeding mechanism 110, the action of the feeding mechanism 110 is controlled according to a sensing signal of the incoming material sensor to drive the cases 600 to be delivered to the delivery mechanism 120. When there is no case 600 on the feeding mechanism 110, the action of the feeding mechanism 110 may be controlled to be stopped according to the signal from the incoming material sensor. The incoming material sensor may be a photosensitive sensor, a pressure sensor, and the like.

Similarly, the manner of controlling the action of the delivery mechanism 120 may also be similar to the control of the feeding mechanism 110, for example, controlling to operate continuously or controlling the start and stop of the delivery mechanism 120 according to incoming materials. For specific circumstances, reference may be made to the above introduction and will not be repeated here.

The feeding mechanism 110 is used for delivering the unpacked cases 600 to the delivery mechanism 120, and the cases 600 are controlled to remain in the second state on the delivery mechanism 120. This facilitates the combing mechanism 130 to separate at least two overlapping cases 600, so that the cases 600 are separated from each other, and the automatic case separating operation of the cases 600 is realized, so that the packaged cases 600 are automatically and orderly separated, and automatic and effective paper removal operations are performed, thereby speeding up the operation pace, and improving the separation efficiency and separation quality.

Figure 8:
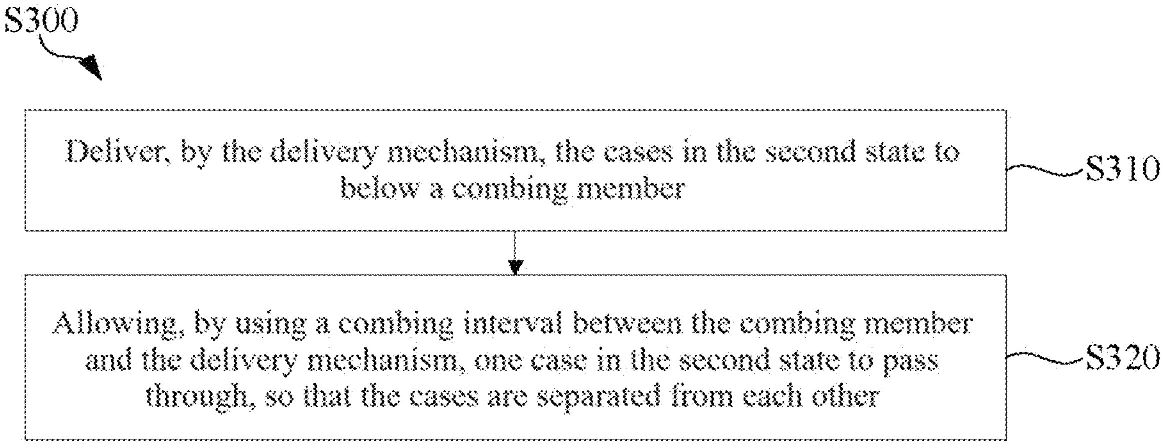
FIG. 8 is a specific schematic flow chart of case combing according to some embodiments of the application.

According to some embodiments of the present application, referring to FIG. 1 and FIG. 8, the step S300 of combing, by using a combing mechanism 130, at least two overlapping cases 600 on the delivery mechanism 120 includes:

- S310: Delivering, by the delivery mechanism 120, the cases 600 in the second state to below a combing member 131; and
- S320: Allowing, by using a combing interval 132 between the combing member 131 and the delivery mechanism 120, one case 600 in the second state to pass through, so that the cases 600 are separated from each other.

There may be one or a plurality of combing members 131. When there are a plurality of combing members 131, in step S310, the delivering, by the delivery mechanism 120, the cases 600 in the second state to below a combing member 131 should be understood that the delivery mechanism 120 deliveries the cases 600 in the second state in sequence to below the plurality of combing members 131.

In addition, the structures of the combing member 131 and the combing interval 132 are consistent with the structures of the combing member 131 and the combing interval 132 in any of the above solutions. Therefore, the specific structures of the two will not be described again here.

In the combing process, the combing interval 132 is arranged between the combing member 131 and the delivery mechanism 120 to allow only one case 600 in the second state to pass, so that the overlapping cases 600 are separated, and the cases 600 pass through the combing interval 132 sequentially in an orderly manner, thereby achieving a stable and orderly automatic case separating operation.

Figure 9:
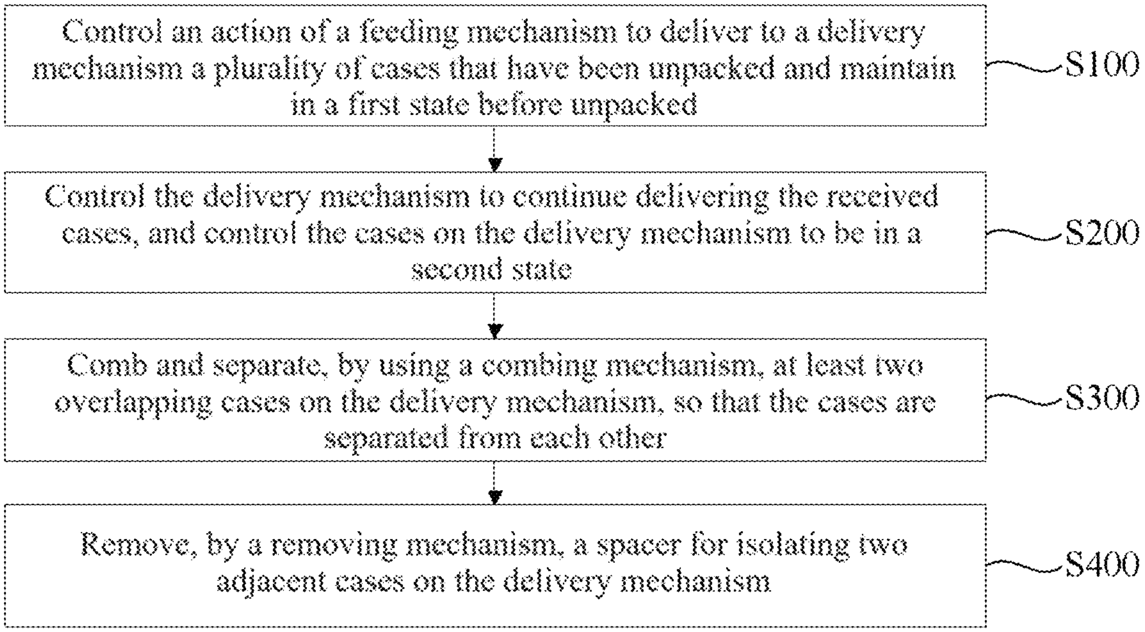
FIG. 9 is a schematic flow chart of an automatic case separating method having spacer removal according to some embodiments of the application.

According to some embodiments of the present application, referring to FIG. 1 and FIG. 9, the method further includes:

- S400: Removing, by a removing mechanism 140, a spacer 620 for isolating two adjacent cases 600 on the delivery mechanism 120.

An execution sequence between step S300 and step S400 may be synchronous execution or sequential execution. When executed synchronously, the combing operation and the operation of removing the spacer 620 are performed at the same time. That is, in the case separation method, the spacer 620 is removed while combing. At this time, the action range of the removing mechanism 140 covers the combing mechanism 130 (for example, the action range of an air blower or a suction ventilator covers the combing mechanism 130), which is beneficial to shortening the working hours. The sequential execution is to first completely separate the overlapping cases 600. After separation, the spacer 620 is delivered to the removing mechanism 140 along with the delivery mechanism 120. At this time, the action range of the removing mechanism 140 is located behind the combing mechanism 130 in the delivery direction L of the delivery mechanism 120. It should be noted that the execution sequence of step S400 is not the timing of starting the removing mechanism 140, and there is no direct relationship between the two. For example, the removing mechanism 140 may be started in advance and kept running during the entire separation process.

The step S400 is used to remove the spacer 620 from the delivery mechanism 120 to avoid the presence of the spacer 620 from interfering with the loading of the case 600, so as to ensure the stable operation of separation of the cases 600; at the same time, it is also beneficial to achieve recycling of the spacer 620 to realize resource recycling.

Figure 10:
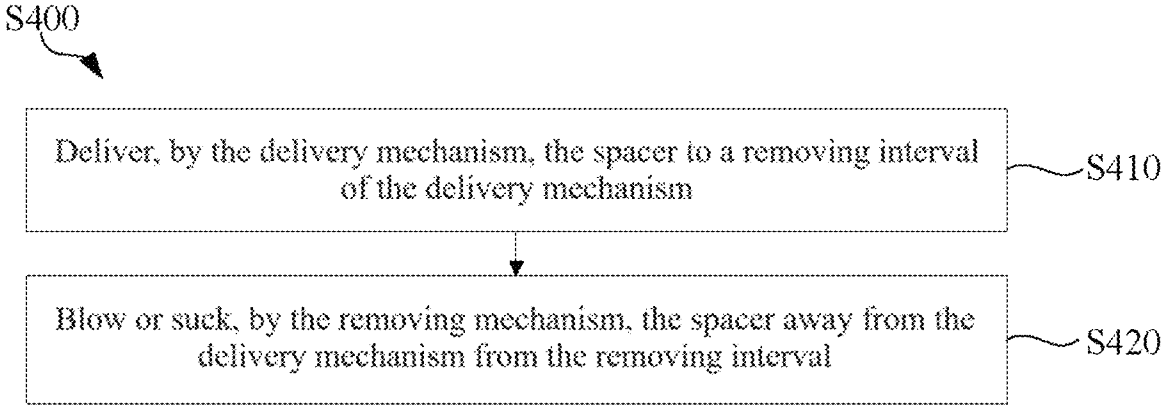
FIG. 10 is a specific schematic flow chart of removing spacers according to some embodiments of the application.

According to some embodiments of the present application, please refer to FIG. 1 and FIG. 10, the step S400 of removing, by a removing mechanism 140, a spacer 620 for isolating two adjacent cases 600 on the delivery mechanism 120 includes:

S410: Delivering, by the delivery mechanism 120, the spacer 620 to the removing interval of the delivery mechanism 120; and S420: Blowing or sucking, by the removing mechanism 140, the spacer 620 away from the delivery mechanism 120 from the removing interval.

The starting mode of the removing mechanism 140 may be continuous operation, or the starting control may be performed based on a detection signal. For example, a device such as a sensor is arranged at the removing interval. If a material is sensed passing through the removing interval, the removing mechanism 140 is started to blow or suck the spacer 620 away from the delivery mechanism 120. Of course, if the case 600 passes through the removing interval and triggers the removing mechanism 140 to start, the case 600 has a certain size, and therefore, even if the removing mechanism 140 is started at this time, the case 600 cannot be blown or sucked away.

By using the specific blowing and sucking manners, the spacer 620 can be removed smoothly under the action of the removing mechanism 140, further ensuring the stable operation of the separation operation of the cases 600.

According to some embodiments of the present application, referring to FIG. 1 to FIG. 6, the present application provides an automatic separation apparatus for aluminum cases. During the operation, one box of aluminum cases is unpacked from an unpacking box, the whole box is placed upside down on a conveyor belt, and the aluminum cases and the spacers 620 are delivered to the nozzle 151. There is a height difference between the feeding mechanism 110 and the delivery mechanism 120. The nozzle 151 blows air to drive the aluminum cases to be blown down through the height difference of the belt. The nozzle 151 blows air to blow the spacers 620 to a vacuum belt. The aluminum cases and the spacers 620 are transferred to the delivery mechanism 120 and enter a spacer removal protective enclosure 170. There is an interval between a conveying assembly 122 and the other conveying assembly 122. The conveying assembly 122 absorbs the spacers 620 and brings the spacers 620 into a recycling box 160 of spacers 620 through the interval. The aluminum cases are conveyed to a detection module 210 through the conveying assembly 122 and transferred to a manipulator, and the manipulator grabs the aluminum cases into the empty tray 500 in the factory.

In addition, there is a feeding station for empty trays 500 in the aluminum case automatic separation layout. The empty tray stack 510 is moved from a material source place to a material delivery place of the empty trays 500 through the belt. The single empty tray 500 is moved to an aluminum case discharging place, the position of which is detected by the tray position, and passed to the manipulator, and the manipulator moves the aluminum case to the tray in the factory. When the non-empty tray stack 530 is full, the whole is transferred to a full tray discharging place via the conveyor belt, and moved to a logistics trolley.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments may still be modified, or some or all of the technical features therein may be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. An automatic case separating apparatus, comprising:

a feeding mechanism configured to receive and deliver a plurality of cases after being unpacked, wherein the plurality of cases maintain a first state before being unpacked;

a delivery mechanism configured to receive and deliver the cases output by the feeding mechanism, wherein when the feeding mechanism delivers the cases to the delivery mechanism, the cases are in a second state on the delivery mechanism; and a combing mechanism configured to comb and separate at least two overlapping cases on the delivery mechanism, so that the cases are separated from each other;

wherein:

the combing mechanism comprises a combing member located above the delivery mechanism, a combing interval is formed between the combing member and the delivery mechanism, and the combing interval is configured to allow a case in the second state to pass through; and the combing member comprises a main body part and a combing part with an elastic deformation function, and the combing part is arranged on the main body part and forms the combing interval with the delivery mechanism.

2. The automatic case separating apparatus according to claim 1, wherein the first state is defined as an upright state of the case; and the second state is defined as a tipped state of the case.

3. The automatic case separating apparatus according to claim 1, wherein an input end of the delivery mechanism is arranged adjacent to an output end of the feeding mechanism, and in a height direction of the delivery mechanism, the input end of the delivery mechanism is lower than the output end of the feeding mechanism.

4. The automatic case separating apparatus according to claim 1, further comprising:

a tipping structure, wherein the tipping structure is configured to drive the cases on the feeding mechanism to tip toward the delivery mechanism.

5. The automatic case separating apparatus according to claim 4, wherein the tipping structure comprises a nozzle, the nozzle is located above the feeding mechanism, and a spray end of the nozzle is arranged toward the delivery mechanism.

6. The automatic case separating apparatus according to claim 1, wherein the combing member is one of at least two combing members of the combing mechanism, all of the combing members are arranged at an interval in a delivery direction of the delivery mechanism, and heights of all the combing intervals show a decreasing trend in the delivery direction of the delivery mechanism.

7. The automatic case separating apparatus according to claim 1, further comprising:

a removing mechanism, wherein the removing mechanism is configured to remove a spacer on the delivery mechanism configured to isolate two adjacent cases.

8. The automatic case separating apparatus according to claim 7, wherein the delivery mechanism comprises a delivery frame and at least two conveying assemblies arranged at an interval on the delivery frame, a removing interval is formed between two adjacent conveying assemblies, and the removing mechanism is configured to remove the spacer from the removing interval.

9. The automatic case separating apparatus according to claim 8, further comprising:

a recycling box, wherein the recycling box is located below the conveying assembly and is in communication with the removing interval.

10. The automatic case separating apparatus according to claim 1, further comprising:

a protective enclosure, wherein the protective enclosure is arranged above the delivery mechanism and the combing mechanism to at least provide protection for the combing operation on the delivery mechanism.

11. A case separation system, comprising:

the automatic case separating apparatus according to claim 1;

a discharging mechanism configured to receive and deliver cases output by the delivery mechanism;

a tray supplying apparatus configured to supply an empty tray; and a material picking apparatus configured to transfer the cases on the discharging mechanism to the empty tray.

12. The case separation system according to claim 11, wherein the tray supplying apparatus comprises a rack and a first lifting mechanism, a second lifting mechanism, and a moving mechanism arranged on the rack, the first lifting mechanism is configured to lift an empty tray stack, such that the uppermost empty tray in the empty tray stack is moved to a tray supplying station, the second lifting mechanism is configured to lower a non-empty tray stack to vacate a loading station, and the moving mechanism is configured to transfer the empty tray on the tray supplying station to the loading station.

13. The case separation system according to claim 12, wherein the moving mechanism comprises a sliding rail and a suction cup, the sliding rail is arranged on the rack and extends in a direction from the tray supplying station to the loading station, and the suction cup is slidably arranged on the sliding rail and configured to suck the empty tray on the tray supplying station.

14. The case separation system according to claim 12, wherein the tray supplying apparatus further comprises a positioning module, and the positioning module is configured to acquire empty tray position information on the loading station to control the material picking apparatus to transfer the cases to the empty tray on the loading station.

15. The case separation system according to claim 12, wherein the tray supplying apparatus further comprises a material preparation mechanism, and the material preparation mechanism is configured to place an empty tray stack and delivering the empty tray stack to the first lifting mechanism.

16. The case separation system according to claim 12, wherein the tray supplying apparatus further comprises a tray output mechanism, and the tray output mechanism is configured to receive and output a non-empty tray stack output from the second lifting mechanism.

17. An automatic case separating method, using the automatic case separating apparatus according to claim 1, comprising:

controlling an action of the feeding mechanism to deliver to the delivery mechanism the plurality of cases that have been unpacked;

controlling the delivery mechanism to continue delivering the received cases, and controlling the cases on the delivery mechanism to be in the second state; and combing and separating, by using the combing mechanism, the at least two overlapping cases on the delivery mechanism, so that the cases are separated from each other.

18. The automatic case separating method according to claim 17, wherein combing and separating, by using the combing mechanism, the at least two overlapping cases on the delivery mechanism comprises:

delivering, by the delivery mechanism, the cases in the second state to below a combing member; and allowing, by using a combing interval between the combing member and the delivery mechanism, one case in the second state to pass through, so that the cases are separated from each other, wherein the method further comprises removing, by using a removing mechanism, a spacer for isolating two adjacent cases on the delivery mechanism, and the step of removing, by using a removing mechanism, a spacer for isolating two adjacent cases on the delivery mechanism comprises:

delivering, by the delivery mechanism, the spacer to a removing interval of the delivery mechanism; and blowing or sucking, by the removing mechanism, the spacer away from the delivery mechanism from the removing interval.

19. An automatic case separating apparatus, comprising:

a feeding mechanism configured to receive and deliver a plurality of cases after being unpacked, wherein the plurality of cases maintain a first state before being unpacked;

a delivery mechanism configured to receive and deliver the cases output by the feeding mechanism, wherein when the feeding mechanism delivers the cases to the delivery mechanism, the cases are in a second state on the delivery mechanism;

a combing mechanism configured to comb and separate at least two overlapping cases on the delivery mechanism, so that the cases are separated from each other; and a tipping structure configured to drive the cases on the feeding mechanism to tip toward the delivery mechanism, wherein the tipping structure comprises a nozzle, the nozzle is located above the feeding mechanism, and a spray end of the nozzle is arranged toward the delivery mechanism.

20. An automatic case separating apparatus, comprising:

a feeding mechanism configured to receive and deliver a plurality of cases after being unpacked, wherein the plurality of cases maintain a first state before being unpacked;

a delivery mechanism configured to receive and deliver the cases output by the feeding mechanism, wherein when the feeding mechanism delivers the cases to the delivery mechanism, the cases are in a second state on the delivery mechanism;

a combing mechanism configured to comb and separate at least two overlapping cases on the delivery mechanism, so that the cases are separated from each other; and a removing mechanism configured to remove a spacer on the delivery mechanism configured to isolate two adjacent cases.

* * * * *